(12) United States Patent
Wistoft-Ibsen (10) Patent No.: US 10,571,076 B2
(45) Date of Patent: Feb. 25, 2020

(54) METHOD FOR REFUELING OF GAS INTO A PRESSURIZED GAS TANK

(71) Applicant: H2 Logic A/S, Herning (DK)

(72) Inventor: Morten Wistoft-Ibsen, Herning (DK)

(73) Assignee: NEL HYDROGEN A/S, Herning (DK)

( * ) Notice: Subject to any disclaimer, the term of this patent is extended or adjusted under 35 U.S.C. 154(b) by 102 days.

(21) Appl. No.: 15/029,347

(22) PCT Filed: Oct. 14, 2013

(86) PCT No.: PCT/DK2013/050327
§ 371 (c)(1),
(2) Date: Apr. 14, 2016

(87) PCT Pub. No.: WO2015/055202
PCT Pub. Date: Apr. 23, 2015

(65) Prior Publication Data
US 2016/0273710 A1    Sep. 22, 2016

(51) Int. Cl.
*F17C 5/00* (2006.01)
*F17C 5/06* (2006.01)
*F17C 13/02* (2006.01)

(52) U.S. Cl.
CPC ............... *F17C 5/007* (2013.01); *F17C 5/06* (2013.01); *F17C 13/025* (2013.01); *F17C 13/026* (2013.01); *F17C 2221/012* (2013.01); *F17C 2223/0123* (2013.01); *F17C 2223/036* (2013.01); *F17C 2225/0123* (2013.01);
(Continued)

(58) Field of Classification Search
CPC .. F17C 5/06; F17C 5/007; F17C 13/02; F17C 13/025; F17C 13/026; F17C 2221/012; F17C 2223/0123; F17C 2223/036; F17C 2225/0123; F17C 2225/036;
(Continued)

(56) References Cited

U.S. PATENT DOCUMENTS 4,478,194 A * 10/1984 Yamato ................ F02D 41/06
                                              123/491
5,570,729 A    11/1996 Mutter
(Continued)

FOREIGN PATENT DOCUMENTS

DE          19705601 A1     8/1998
DE       102007012080 A1    9/2008
(Continued)

OTHER PUBLICATIONS

International Search Report for corresponding application PCT/DK2013/050327 filed Oct. 14, 2013; dated Nov. 9, 2014.

*Primary Examiner* — Andrew D StClair
(74) *Attorney, Agent, or Firm* — Cantor Colburn LLP (57) ABSTRACT

A method for refueling of gas into a pressurized gas tank with repeated adjustment of a target pressure (Ptarget) for the refueling is disclosed, said method comprising the steps of: recording starting conditions for the refueling, establishing a mathematical relation between the recorded starting conditions, the actual refueling time (t_refueling) passed and the target pressure for the refueling, starting the refueling, and repeatedly calculating the target pressure corresponding to the actual refueling time passed and measuring the nozzle pressure of the refueling station, until the calculated target pressure has been reached.

5 Claims, 5 Drawing Sheets

(52) U.S. Cl.
CPC .. *F17C 2225/036* (2013.01); *F17C 2250/032* (2013.01); *F17C 2250/043* (2013.01); *F17C 2250/0439* (2013.01); *F17C 2250/0473* (2013.01); *F17C 2250/0626* (2013.01); *F17C 2250/0694* (2013.01); *F17C 2250/075* (2013.01); *F17C 2260/025* (2013.01); *F17C 2265/065* (2013.01); *F17C 2270/0139* (2013.01)

(58) Field of Classification Search
CPC .......... F17C 2250/032; F17C 2250/043; F17C 2250/0473
See application file for complete search history.

(56) References Cited

U.S. PATENT DOCUMENTS

| | | | |
|---|---|---|---|
| 8,360,112 B2 | 1/2013 | Allidieres et al. | |
| 9,347,612 B2* | 5/2016 | Mathison | F17C 5/007 |
| 2007/0125441 A1* | 6/2007 | Farese | F17C 5/06 141/2 |
| 2009/0044877 A1* | 2/2009 | Faudou | F17C 5/06 141/4 |
| 2009/0107577 A1* | 4/2009 | Allidieres | F17C 5/007 141/1 |
| 2011/0022337 A1 | 1/2011 | Macron | |
| 2011/0259469 A1* | 10/2011 | Harty | F17C 5/007 141/4 |
| 2014/0174593 A1 | 6/2014 | Ammouri | |
| 2014/0202584 A1* | 7/2014 | Mathison | F17C 5/007 141/4 |
| 2014/0290790 A1* | 10/2014 | Mathison | F17C 5/06 141/4 |

FOREIGN PATENT DOCUMENTS

| | | |
|---|---|---|
| DE | 102010027683 A1 | 1/2012 |
| EP | 0653585 A1 | 5/1995 |
| FR | 2978233 A1 | 1/2013 |

\* cited by examiner

METHOD FOR REFUELING OF GAS INTO A PRESSURIZED GAS TANK

TECHNICAL FIELD

The present invention relates to a method for refueling of gas into a pressurized gas tank with repeated adjustment of a target pressure for the refueling,

BACKGROUND OF THE INVENTION

When gas is filled into a pressurized tank, the compression heat from the compression of the gas causes the temperature of the gas inside the tank and, consequently, also the temperature of the tank material to increase significantly.

Such gas tanks typically have a certain upper temperature limit. For instance, a hydrogen tank for use in a vehicle normally has an upper temperature limit of 85° C., which may not be exceeded by the hydrogen temperature inside the tank at any time during the refueling of the tank.

The increase of the temperature of the gas inside the tank is highly dependent on the refueling time, i.e. time used for filling the tank. The longer the refueling time, the more heat energy will be transferred from the gas inside the tank through the tank material to the environments during the refueling. Consequently, a fast refueling results in a higher gas temperature inside the gas tank than a slow refueling.

In order to avoid that the upper temperature limit is exceeded, the refueling time is normally adjusted so that the upper temperature limit will only be reached in the most extreme case, known as the "hot case". Thus, if the conditions in the gas tank are not extreme, the temperature of the gas therein will stay below the upper temperature limit at any time during the refueling. The "hot case" conditions are normally calculated from a model taking into consideration different parameters of which the ambient temperature is one of the most important.

For a gas tank with a fixed volume, the density ($\rho$) of the gas therein is directly proportional to the mass of the gas and, thereby, to the amount of gas in the tank. The density of a given type of gas depends only on the pressure (P) and the temperature (T) of the gas.

Thus, when the temperature and the pressure of the gas within a tank of a well-defined volume is known, the density of the gas and, thereby, also the amount of gas in the tank is completely defined. This means that, if the refueling is stopped at a certain target pressure, the amount of gas in the tank depends on the temperature of the gas.

The term "State Of Charge" (SOC) is normally used for quantifying the actual amount of gas inside a gas tank. SOC is defined as the ratio between the actual gas density and a nominal density, where the nominal density is the density at the Nominal Working Pressure (NWP) at a certain reference temperature (typically 15° C.). Thus $$SOC[\%] = \frac{\rho_{P,T}}{\rho_{NWP,15° C.}} \cdot 100 \quad (1)$$

This equation states that the gas tank is full, if the gas density inside the tank equals the nominal density. If SOC exceeds 100%, the tank is overfilled.

In refueling situations at which the vehicle does not communicate the gas tank pressure and temperature to the refueling station, a suitable stop criterion is needed in order to stop the refueling process at an appropriate stage. Typically, a predefined target pressure is used to stop the refueling before the vehicle tank is overfilled. This target pressure can be defined in several different ways, but typically it depends on the ambient temperature and the start pressure within the gas tank before the refueling. Due to the lack of communication from the vehicle, the tank temperature is unknown, which means that the SOC will also be unknown to a certain extent, even if the refueling is stopped exactly at the predefined target pressure.

The target pressure is normally defined by calculations and/or measurements prior to the refueling. This means that a number of assumptions, including the refueling time and corresponding refueling time tolerances, have to be made when defining the target pressure. When calculating the target pressure, the so-called "cold case" conditions are used. This means that the target pressure is defined as the pressure which, at the gas temperature resulting from the longest possible refueling time within the defined tolerances, results in an SOC of 100%. If the refueling takes place faster than defined by the "cold case" conditions, the increase of the gas temperature will be larger, and target pressure will be reached and the refueling will be stopped before the SOC reaches 100%.

As long as the actual refueling time corresponds to the assumed refueling time within the corresponding tolerances, a safe refueling with a gas temperature below the upper temperature limit and an SOC not exceeding 100% is ensured. If, however, the refueling time falls outside the tolerances, problems may occur. If the refueling time is too short, the upper temperature limit may be exceeded, and if the refueling time is too long, the tank may be overfilled.

This means that, if the refueling is too slow, it has to be stopped before the target pressure has been reached because there is a risk of overfilling the vehicle tank. This is unfortunate and inconvenient for the customer, who would normally rather experience a slow refueling than not having his vehicle refueled at all.

One of the most likely reasons for slow refueling with the refueling time exceeding the tolerances is low refueling station capacity. Consequently, there is typically a lower limit for the refueling station capacity, below which the refueling station is not able to perform a refueling within the defined refueling time tolerances, and a certain part of the refueling station capacity cannot be utilized. This is both an inefficient and unnecessarily expensive situation.

BRIEF SUMMARY

The disclosure provides a method for refueling vehicles from a gas refueling station without this above-mentioned disadvantage.

The present invention relates to a method for refueling of gas into a pressurized gas tank with repeated adjustment of a target pressure for the refueling, said method comprising the steps of: recording starting conditions for the refueling, establishing a mathematical relation between the recorded starting conditions, the actual refueling time passed and the target pressure for the refueling, starting the refueling, and repeatedly calculating the target pressure corresponding to the actual refueling time passed and measuring the nozzle pressure of the refueling station, until the calculated target pressure has been reached.

The introduction of a repeatedly adjusted target pressure eliminates the need for a lower refueling time tolerance and, thereby, the risk of interruption of the refueling due to time-out because this time tolerance is exceeded. This means that the full capacity of the refueling station can be utilized, which is beneficial for the operator thereof. Furthermore, it is beneficial for the customer, who will obtain a full gas tank even if the capacity of the refueling station is low.

In an embodiment of the invention, the pressurized gas tank is a gas tank of a vehicle.

In an embodiment of the invention, the refueled gas is hydrogen.

In an embodiment of the invention, the target pressure is calculated at equal time intervals controlled by a timer.

In an embodiment of the invention, the time interval between two subsequent calculations of the target pressure is between 0.1 seconds and 10 seconds, preferably between 0.5 seconds and 5 seconds, most preferably between 1 second and 2 seconds.

Calculating the actual target pressure at equal time intervals within the described ranges is advantageous for obtaining a safe and reliable refueling procedure without any risk of overfilling the gas tank.

In an embodiment of the invention, the recorded starting conditions for the refueling included the ambient temperature and/or the gas tank starting pressure.

Tests have shown that recording the ambient temperature and the gas tank starting pressure is sufficient for obtaining reliable mathematical relations between the actual refueling time and the target pressure.

In an embodiment of the invention, the mathematical relation is a linear function, a logarithmic function or a polynomial-regression function correlating the target pressure to the actual refueling time.

In an embodiment of the invention, the mathematical relation expresses the target pressure as a function of the actual refueling time and comprises one or more coefficients depending on the recorded starting conditions for the refueling.

In an embodiment of the invention, the coefficients of the mathematical relation is found by looking up in a table after recording the starting conditions for the refueling, the coefficients in the table being found by making a number of refueling simulations with different starting conditions and refueling times.

In an embodiment of the invention, linear interpolation, logarithmic interpolation or other types of interpolation between the coefficients in the table is used for finding the coefficients corresponding to the actual starting conditions for the refueling and the actual refueling time.

As long as there is a consistent relation between the chosen representation and the simulated target pressure values, there are no constraints on the methods used for representing the target pressure values.

BRIEF DESCRIPTION OF THE FIGURES

A few exemplary embodiments of the invention is described in more detail in the following with reference to the figures, of which

DETAILED DESCRIPTION

Figure 1:
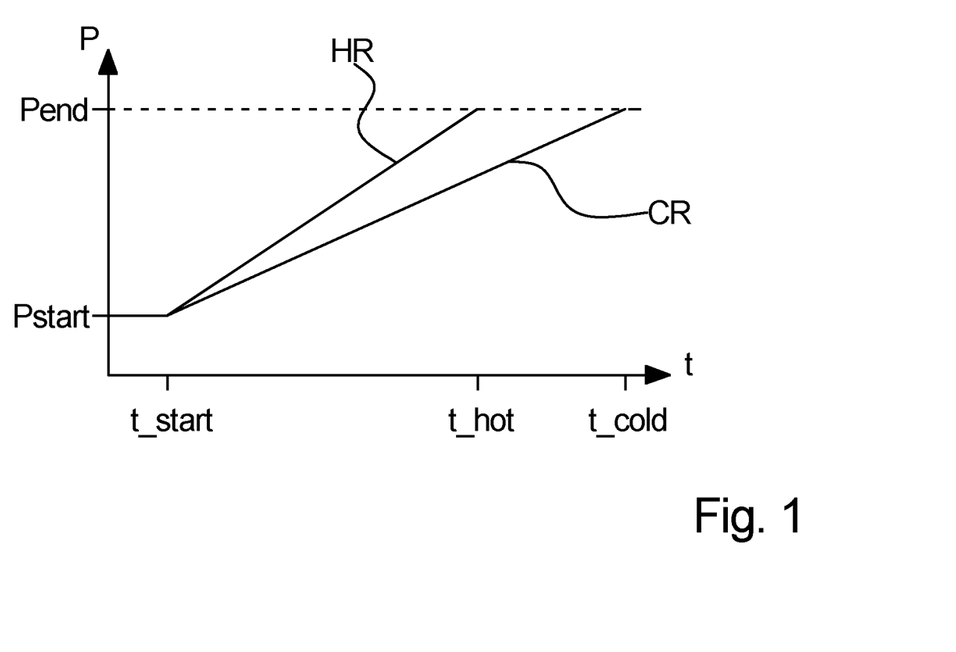
FIG. 1 illustrates schematically the time-pressure curve for a gas tank during hot and cold refueling, respectively.

FIG. 1 illustrates schematically the time-pressure curve for a gas tank during hot refueling HR and cold refueling CR, respectively.

The two curves HR, CR illustrate the time-pressure relationships for a first refueling, which increases the tank pressure from a given start pressure Pstart to a given end pressure Pend during a refueling time beginning at t_start and ending at t_hot, and for a second refueling with the same start pressure Pstart, end pressure Pend and start time t_start but a later end time t_cold, respectively.

The time-pressure curve relating to the first and fastest refueling is marked with the letters HR (hot refueling), whereas the time-pressure curve for the second and slower refueling is marked with the letters CR (cold refueling). This is due to the fact that, if the refueling time is shorter, less time is available for heat energy to be transferred from the gas through the tank material to the environments, and the temperature increase in the gas during the refueling is larger.

This has to be taken into consideration when refueling a gas tank, because most gas tanks have an upper temperature limit (normally 85° C.), below which the temperature of the gas within the tank must be kept at all times. Furthermore, gas tanks also have an upper pressure limit, which may not be exceeded by the gas within the tank.

Figure 2:
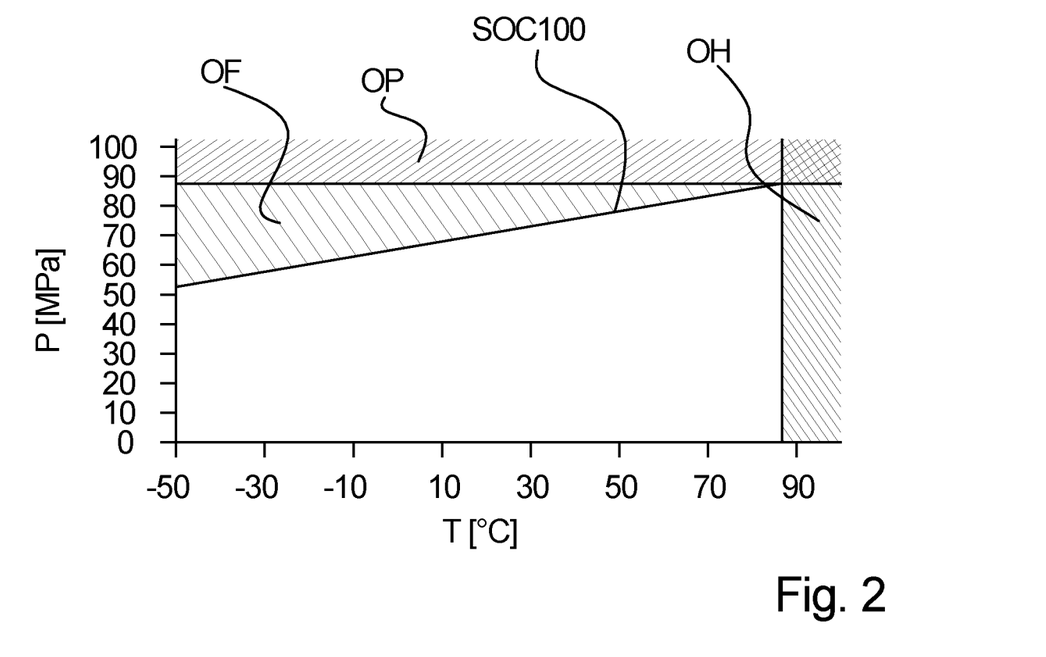
FIG. 2 illustrates an example of a refueling window for a hydrogen refueling.

Together with the requirement that the State Of Charge (SOC) as defined above must not exceed 100%, the temperature and pressure limitations of the gas tank define a so-called refueling window for a given gas tank. FIG. 2 illustrates an example of such a refueling window for hydrogen refueling of a 70 MPa tank with an upper pressure limit of 87.5 MPa.

FIG. 2 illustrates how situations with overpressure OP and overheat OH occur, if the upper pressure limit of 87.5 MPa and the upper temperature limit of 85° C., respectively, are exceeded. Furthermore, the line SOC100 indicates the corresponding values of the gas temperature and pressure at which the State Of Charge is exactly 100%, corresponding in this case to a nominal density of the hydrogen of 40.2 kg/m$^3$ at 15° C. If, for any given temperature of the gas, the pressure of the gas is higher than indicated by the SOC100 line, the gas tank is overfilled OF.

In situations where the vehicle does not communicate the pressure and temperature of the gas in the tank to the refueling station, a stop criterion is needed for stopping the refueling before the vehicle tank is overfilled (SOC>100%). Typically, a predefined target pressure Ptarget depending on the ambient temperature and on the gas tank start pressure Pstart before the refueling is used. Thus, the end time for the refueling t_end is defined at the time at which the pressure of the gas within the tank reaches the target pressure Ptarget as indicated schematically in FIG. 3a. However, as the temperature of the gas within the tank is unknown in the situation without communication from the vehicle, also the actual State Of Charge is unknown to a certain extent, even if the refueling is stopped precisely when the predefined target pressure Ptarget has been reached.

In systems known in the art, the target pressure Ptarget is defined by calculations or test prior to the refueling. This means that a number of assumptions have to be made, including the refueling time and corresponding refueling time tolerances LRTT, URTT as illustrated schematically in FIG. 3b.

Figure 3A:
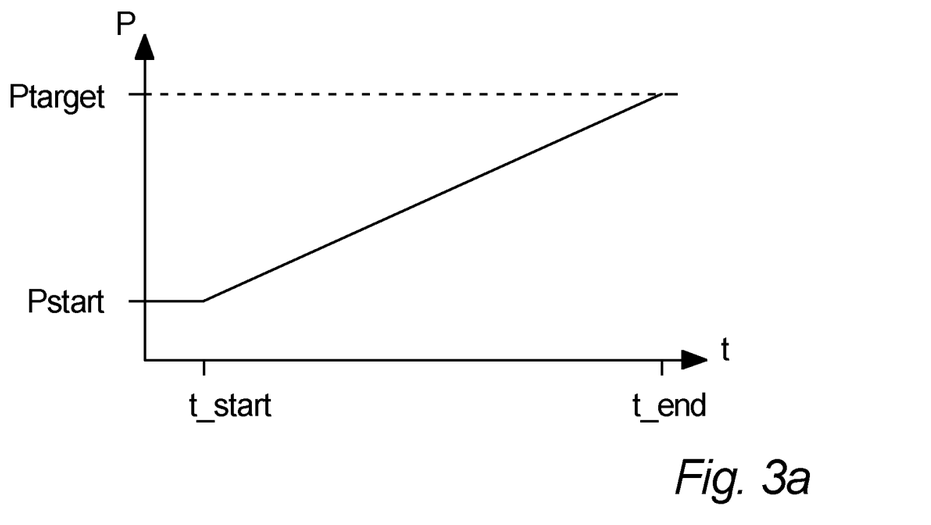
FIG. 3a illustrates schematically the time-pressure curve for a gas tank during refueling using methods known in the art.
Figure 3B:
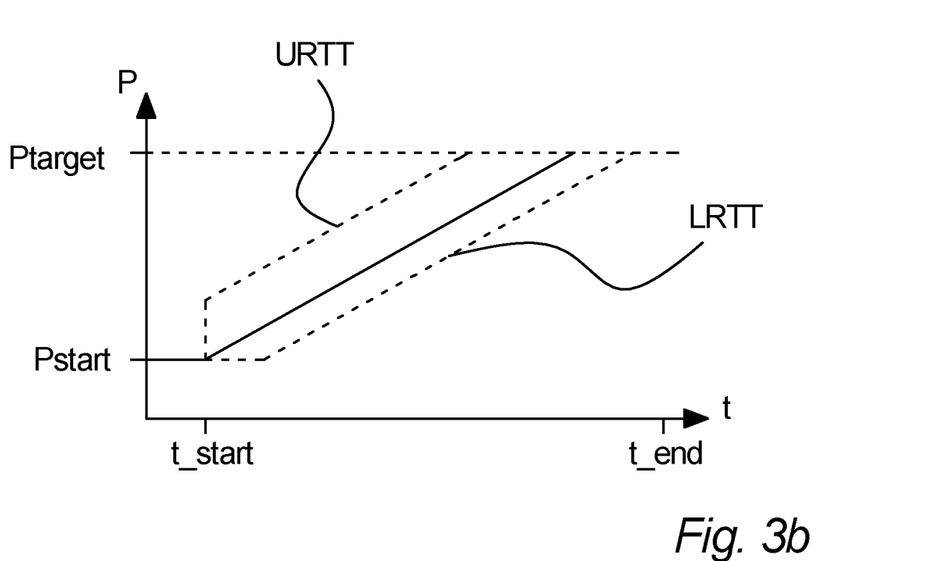
FIG. 3b illustrates the same curve as FIG. 3a with refueling time tolerances added.

This figure corresponds to FIG. 3a with the addition of a lower refueling time tolerance LRTT and an upper refueling time tolerance URTT. The upper refueling time tolerance URTT defining the shortest allowable refueling time and, thereby, the fastest allowable refueling is chosen to ensure that the gas tank is not overheated (the so-called "hot case" assumption). The lower refueling time tolerance LRTT, on the other hand, defines the longest allowable refueling time and, thereby, the lowest possible final gas temperature, known as the "cold case". This cold case is used for defining the target pressure Ptarget, which is therefore the gas pressure which, in combination with the lowest possible final gas temperature results in a State Of Charge of 100%. Thus, the combination of the refueling time (including lower and upper tolerances LRTT, URTT) and the target pressure ensures a safe refueling without neither overheating nor overfilling of the gas tank.

However, a consequence of using a lower refueling time tolerance LRTT is that, if this lower refueling time tolerance LRTT is exceeded, the refueling has to be stopped because there is a risk of overfilling the vehicle tank. Stopping the refueling because it is too slow is unfortunate and inconvenient for the customer, who typically prefers a complete (although slow) refueling rather than an incomplete refueling of the vehicle tank.

One of the most likely reasons for exceeding the lower refueling time tolerance LRTT is low refueling station capacity resulting in a slower refueling. This means that, typically, there will be a lower limit for the refueling station capacity below which no refueling can be done. Consequently, a certain part of the refueling station capacity cannot be utilized, which is inefficient and adds unnecessary expenses to the operation of the refueling station.

Figure 4A:
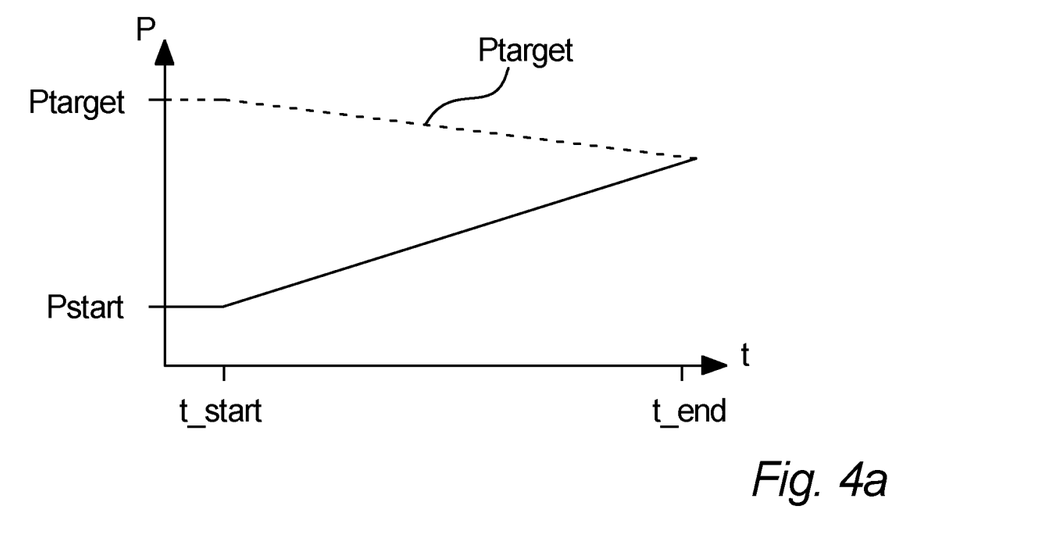
FIG. 4a illustrates schematically a time-pressure curve for a gas tank during slow refueling using a method according to the invention.
Figure 4B:
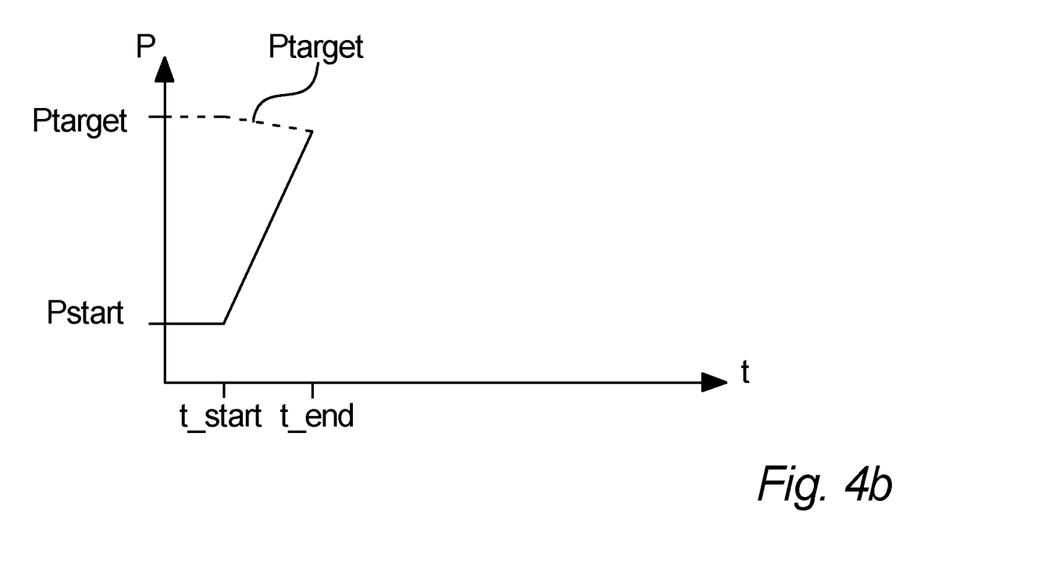
FIG. 4b illustrates schematically a time-pressure curve for a gas tank during fast refueling using a method according to the invention.

The present invention addresses this problem by making the target pressure Ptarget dependent on the actual refueling time in addition to the ambient temperature and the vehicle tank start pressure, thereby eliminating the need for a lower refueling time tolerance LRTT. Thus, the target pressure Ptarget is no longer a fixed value defined prior to the refueling. Rather, it is adjusted continuously during the refueling as indicated schematically in FIGS. 4a and 4b for a slow and a fast refueling, respectively. As can be seen from FIGS. 4a and 4b, the target pressure Ptarget is constant until the starting time t_start of the refueling, because the adjustment of the target pressure Ptarget takes place only during the actual refueling, i.e. when gas is flowing into gas tank.

The upper refueling time tolerance URTT is still relevant for avoiding an overheat situation and also for defining the shortest possible refueling time for which the target pressure Ptarget is defined. The cold case assumptions also still have to be considered for avoiding overfilling of the vehicle tank. However, rather than considering only a single refueling time, a refueling time range has to be considered. Optimally, this refueling time range should stretch from the upper refueling time tolerance URTT (defining the fastest possible refueling according to the hot case assumption) to an infinitely long refueling time. For practical reasons, however, the refueling time must be limited either by decreasing the target pressure or by other features of the refueling station.

Figure 5:
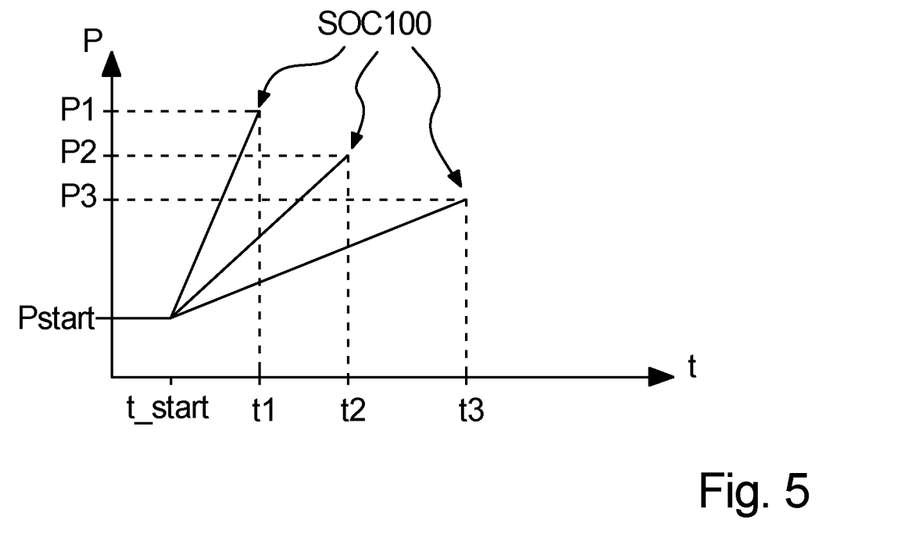
FIG. 5 illustrates schematically the time-pressure curves for three different refueling simulations.

In order to be able to define the target pressure Ptarget in dependency of the ambient temperature, the gas tank starting pressure Pstart and the actual refueling time, several refueling simulations are needed to create an overview of the relations between these parameters. All these simulations are based on the cold case assumptions, meaning that the stop criterion is a SOC of 100%. Thus, each of the refueling simulations will stop when 100% SOC is reached and the end pressure Pend is recorded as the target pressure Ptarget for that particular refueling simulation. FIG. 5 illustrates schematically how three different end pressures P1, P2, P3 are recorded for three simulations reaching 100% SOC after refueling times t1, t2 and t3, respectively.

In order to cover the relevant sample space, each of the three parameters (gas tank starting pressure, ambient temperature and refueling time) must be varied with appropriate steps across specified ranges, while any other parameters are kept constant. For instance, for constant gas tank starting pressure and ambient temperature, variation of the refueling time accounts for different temperature developments of the gas in the tank (longer refueling time results in lower gas temperature and vice versa).

For refueling of a 35 MPa hydrogen tank, the ranges and steps can, for instance, be defined as follows:
  Gas tank starting pressure [MPa]: 2; 10; 20; 30
  Ambient temperature [° C.]: −20; −10; 0; 10; 20; 30; 40
  Refueling time [s]: 100; 150; 200; 250; 500; 750; 1000
  Similar ranges and steps can be defined for a 70 MPa refueling, as the present invention is independent of the nominal working pressure of the pressure tank.

In the above example, 4 different starting pressures, 7 different ambient temperatures and 7 different refueling times results in a total of 4*7*7=196 simulated refueling and, consequently, 196 different target pressure values.

For a simpler example with 3*3*3=27 simulated refueling, the results may be presented in a table like the following:

| Pstart | t_refueling | Tamb,1 | | Tamb,2 | | Tamb,3 | |
|---|---|---|---|---|---|---|---|
| | | Pend | SOCend | Pend | SOCend | Pend | SOCend |
| Pstart,1 | t1 | Pend,1 | 100% | Pend,10 | 100% | Pend,19 | 100% |
| Pstart,1 | t2 | Pend,2 | 100% | Pend,11 | 100% | Pend,20 | 100% |
| Pstart,1 | t3 | Pend,3 | 100% | Pend,12 | 100% | Pend,21 | 100% |
| Pstart,2 | t1 | Pend,4 | 100% | Pend,13 | 100% | Pend,22 | 100% |
| Pstart,2 | t2 | Pend,5 | 100% | Pend,14 | 100% | Pend,23 | 100% |
| Pstart,2 | t3 | Pend,6 | 100% | Pend,15 | 100% | Pend,24 | 100% |
| Pstart,3 | t1 | Pend,7 | 100% | Pend,16 | 100% | Pend,25 | 100% |
| Pstart,3 | t2 | Pend,8 | 100% | Pend,17 | 100% | Pend,26 | 100% |
| Pstart,3 | t3 | Pend,9 | 100% | Pend,18 | 100% | Pend,27 | 100% |

Typical target pressure values range from 30-40 MPa for a 35 MPa hydrogen refueling and from 62-78 MPa for a 70 MPa hydrogen refueling.

Data sets like the above relate the target pressure Ptarget to the gas tank starting pressure, the ambient temperature and the actual refueling time. Plotting the target pressure Ptarget as a function of the actual refueling time t1, t2, t3 for different gas tank starting pressures at a given ambient temperature reveals that there is a consistent relation between the target pressure Ptarget and the refueling time t1, t2, t3.

Figure 6:
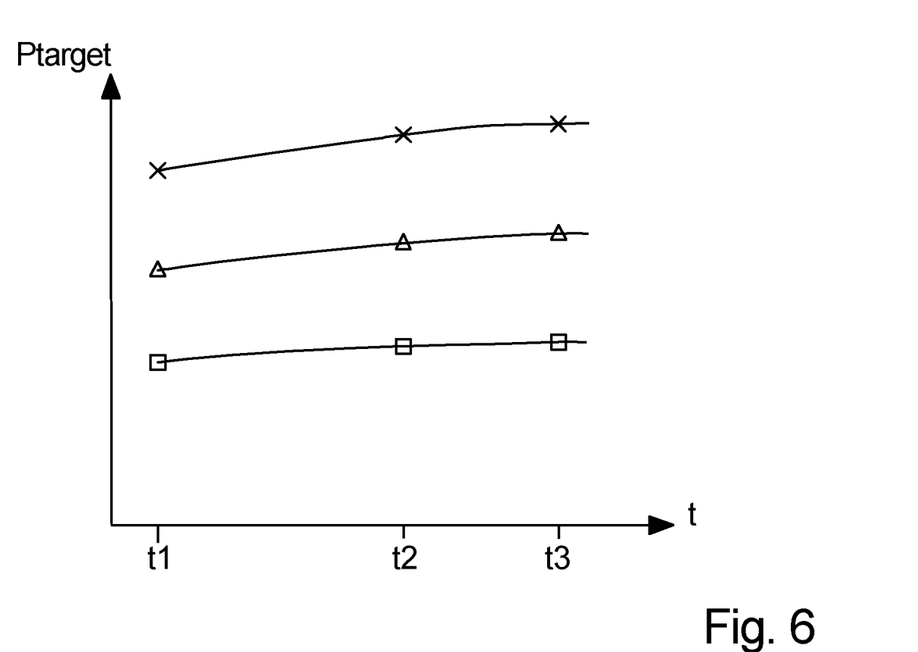
FIG. 6 illustrates schematically the relations between the refueling time and the target pressure for three different starting pressures.

FIG. 6 illustrates schematically such a relation between the target pressure Ptarget and the refueling times t1, t2, t3 at a given ambient temperature for three different gas tank starting pressures represented by the symbols x, Δ and □, respectively. Thus, for each ambient temperature step and each gas tank starting pressure, correlations can be made that relate the target pressure Ptarget to the actual refueling time t1, t2, t3. This results in a number of different functions for each ambient temperature.

In other words, the target pressure Ptarget can be expressed as a function of the actual refueling time, wherein coefficients of the function depend on the ambient temperature and the gas tank starting pressure. These functions may be linear, logarithmic, polynomial-regression functions or similar mathematical expressions, such as for instance the following logarithmic function:

$$f(t\_refueling) = a_{x,x} \cdot \ln(t\_refueling) + b_{x,x} \quad (2)$$

The number of coefficients depend on the function which best represents the correlation between the simulated target pressure values Ptarget and refueling times t1, t2, t3. The coefficients may be presented in a table like the following:

| | Target pressure function coefficients, f(t_refueling) | | | | |
|---|---|---|---|---|---|
| | Pstart, 1 | Pstart, 2 | Pstart, 3 | Pstart, 4 | Pstart, 5 |
| Tamb, 1 | $a_{1,1}$, $b_{1,1}$, ... | $a_{1,2}$, $b_{1,2}$, ... | $a_{1,3}$, $b_{1,3}$, ... | $a_{1,4}$, $b_{1,4}$, ... | $a_{1,5}$, $b_{1,5}$, ... |
| Tamb, 2 | $a_{2,1}$, $b_{2,1}$, ... | ... | | | ... |
| Tamb, 3 | $a_{3,1}$, $b_{3,1}$, ... | | | | ... |
| Tamb, 4 | $a_{4,1}$, $b_{4,1}$, ... | | | | ... |
| Tamb, 5 | $a_{5,1}$, $b_{5,1}$, ... | ... | ... | ... | ... |

Interpolations (linear, logarithmic or similar) can be used for finding coefficients corresponding to ambient temperatures and gas tank starting pressures between the ones used in the simulations.

Figure 7:
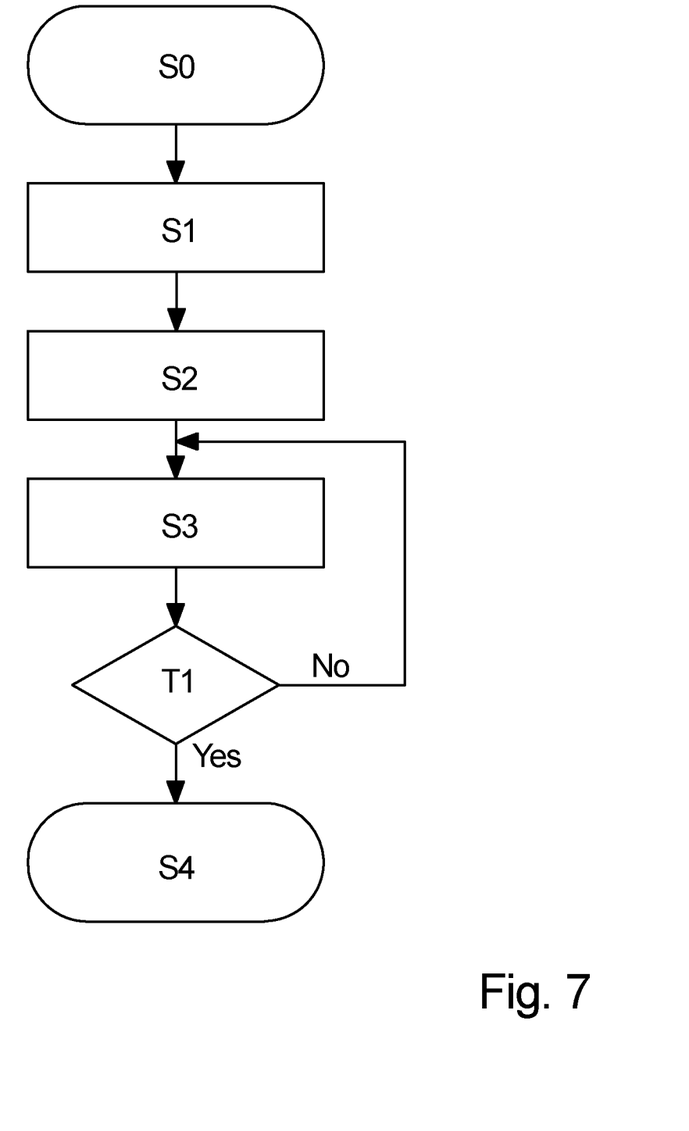
FIG. 7 is a flow chart of a refueling procedure according to an embodiment of the invention.

A flow chart of a refueling procedure according to an embodiment of the invention using the logarithmic target pressure function defined by Equation 2 above is shown in FIG. 7. This flow chart comprises five method steps S0-S4 and a single decision step T1:

S0: Start of refueling procedure
S1: Prepare the refueling
  Record the ambient temperature Tamb.
  Record the gas tank starting pressure Pstart.
  Look-up the target pressure function coefficients $a_{x,x}$ and $b_{x,x}$ corresponding to the recorded ambient temperature Tamb and gas tank starting pressure Pstart in a table. If necessary, interpolate between the coefficients in the table to define the correct coefficients.

S2: Start the refueling
  Start the refueling.
  Start a timer measuring the actual refueling time t_refueling.

S3: Calculate the target pressure
  Wait for a predefined period of time (for instance 1 second).
  Calculate the actual target pressure Ptarget corresponding to the actual refueling time t_refueling using the equation:

$$Ptarget = a_{x,x} \cdot \ln(t\_refueling) + b_{x,x}$$

T1: Decision step:
  Measure the actual nozzle pressure of the refueling station.
  If the actual target pressure P is reached, continue to step S4.
  Otherwise, return to step S3.

S4: End of refueling procedure

In the above example, the target pressure function coefficients are looked up in a 2-dimensional table. In other embodiments, coefficient tables with higher dimensions can be used, or a mathematical function calculating the target pressure directly from the ambient temperature, the gas tank starting pressure and the actual refueling time without the above-described table based approach may be used:

$$Ptarget = f(Tamb, Pstart, t\_refueling) \quad (3)$$

The invention claimed is:

1. A method for refueling of hydrogen gas into a pressurized gas tank of a vehicle with repeated calculation and adjustment of a target pressure (Ptarget) for the refueling, said method comprising the steps of:
   recording starting conditions for the refueling, including at least starting pressure (Pstart) and ambient temperature,
   starting the refueling procedure,
   calculating the target pressure for the refueling as a logarithmic function of the actual refueling time (t_refueling) passed, wherein coefficients of the logarithmic function are selected using the ambient temperature and the starting pressure,
   repeatedly calculating and adjusting the target pressure corresponding to the actual refueling time passed and measuring the nozzle pressure of the refueling station, and
   ending the refueling procedure when the measured nozzle pressure reaches the calculated target pressure.

2. The method according to claim 1, wherein the target pressure is calculated at equal time intervals controlled by a timer.

3. The method according to claim 2, wherein the time interval between two subsequent calculations of the target pressure is between 0.1 seconds and 10 seconds.

4. The method according to claim 1, wherein one or more of the coefficients of the logarithmic function expressing the target pressure as a function of the actual refueling time further is found by looking up in a table after recording the starting conditions for the refueling, the coefficients in the table being found by making a number of refueling simulations with different starting conditions and refueling times.

5. The method according to claim 4, wherein linear interpolation, logarithmic interpolation or other types of interpolation between the coefficients in the table is used for finding the coefficients corresponding to the actual starting conditions for the refueling and the actual refueling time.

* * * * *